US010538820B2

(12) United States Patent
Bilodeau

(10) Patent No.: US 10,538,820 B2
(45) Date of Patent: Jan. 21, 2020

(54) REVERSING MAPLE SYRUP EVAPORATOR

(71) Applicant: Sylvain Bilodeau, St-Éphrem-de-Beauce (CA)

(72) Inventor: Sylvain Bilodeau, St-Éphrem-de-Beauce (CA)

(*) Notice: Subject to any disclaimer, the term of this patent is extended or adjusted under 35 U.S.C. 154(b) by 380 days.

(21) Appl. No.: 14/700,943

(22) Filed: Apr. 30, 2015

(65) Prior Publication Data

US 2015/0314214 A1    Nov. 5, 2015

(30) Foreign Application Priority Data

May 5, 2014  (CA) ..................................... 2851034

(51) Int. Cl.
*C13B 25/00*    (2011.01)
(52) U.S. Cl.
CPC ................... *C13B 25/00* (2013.01)
(58) Field of Classification Search
CPC .................. B01D 3/42; C13B 25/00
See application file for complete search history.

(56) References Cited

U.S. PATENT DOCUMENTS

| 1,991,471 | A |  | 2/1935 | Snow et al. |
| 2,257,362 | A |  | 9/1941 | Zitkowski |
| 3,891,496 | A |  | 6/1975 | Erwin |
| 4,029,577 | A |  | 6/1977 | Godlewski et al. |
| 4,264,463 | A |  | 4/1981 | Kotake et al. |
| 4,323,429 | A | * | 4/1982 | Hoover ................ B01D 3/02 202/185.5 |
| 5,162,081 | A | * | 11/1992 | Bowes .................. B01D 3/00 203/18 |

(Continued)

FOREIGN PATENT DOCUMENTS

| CA | 719901 | 10/1965 |
| CA | 726225 | 1/1966 |

(Continued)

OTHER PUBLICATIONS

English translation of the abstract of the Japanese patent publication No. JP58043202.

(Continued)

*Primary Examiner* — Matthew D Krcha
(74) *Attorney, Agent, or Firm* — Bereskin & Parr LLP

(57) ABSTRACT

An apparatus for reversing flow of partially evaporated maple syrup in at least one evaporating pan includes a transfer line having an inlet for connected to a heating and pan for receiving partially evaporated maple syrup from the heating pan. A first sub-line extends from the transfer line and can connect to a first port of the evaporating pan(s). A second sub-line extends from the transfer line and can connected to a second port of the evaporating pan(s). A first outlet line extends from the transfer line or the first sub-line. A second outlet line extends from the transfer line or the second sub-line. When the first and second sub-lines are connected to the first and second ports respectively, the transfer line is positioned at a height no higher than the heights of the first and second ports. The first and second outlet lines are positioned at a height no higher than the transfer line. When fluid exits the evaporating pan(s) via the first or second ports, the fluid reaches the first or second outlet lines prior to reaching the transfer line.

5 Claims, 3 Drawing Sheets

(56) References Cited

U.S. PATENT DOCUMENTS

| | | | |
|---|---|---|---|
| 5,275,666 A * | 1/1994 | Goodrich | B01D 1/04 127/11 |
| 5,389,209 A | 2/1995 | Paquette | |
| 5,772,774 A | 6/1998 | Chabot | |
| 5,893,969 A * | 4/1999 | Goldman | B01D 35/14 210/143 |
| 7,794,547 B2 | 9/2010 | Mann | |
| 2012/0152236 A1 | 6/2012 | Bilodeau | |

FOREIGN PATENT DOCUMENTS

| | | | | |
|---|---|---|---|---|
| CA | 1144871 | | 4/1983 | |
| CA | 2037888 | | 4/1992 | |
| CA | 1318236 | | 5/1993 | |
| CA | 2193035 | | 6/1998 | |
| CA | 2386368 A1 * | 11/2003 | | C13B 25/00 |
| GB | 1005538 | | 9/1965 | |
| GB | 1190657 | | 5/1970 | |
| JP | 58043202 | | 12/1983 | |
| WO | WO2008139647 | | 11/2008 | |
| WO | WO2008142810 | | 11/2008 | |

OTHER PUBLICATIONS

Leader Evaporator Co., Inc., Maple Sugar Makers' Guide, St. Albans, Vermont, USA.
Les Évaporateurs Waterloo, Listes de prix 1985, 1986, 1987 and 1996.
Dominion & Grimm Inc., Designs.

* cited by examiner

REVERSING MAPLE SYRUP EVAPORATOR

FIELD

The present subject-matter relates an apparatus for evaporation of water from maple sap in the production of maple syrup, and more particularly to an evaporation apparatus that reverses the flow of partially evaporated syrup in the secondary evaporating pan.

Introduction

Maple syrup is made from the sap of maples trees. In cold climate areas, the trees store starch in their roots and trunk before the winter; the starch is then converted to sugar and rises in the sap in the spring. Maple trees can be tapped and the exuded sap collected and concentrated by heating to evaporate the water. The average maple tree will produce about 50 liters of sap per season. To obtain one liter of maple syrup, about 40 liters of sap must be boiled.

Maple syrup consists primarily of sucrose (more than 60% by weight) and water, with small amounts of minerals and other sugars such as fructose and glucose. The mineral content of the maple syrup is mainly potassium and calcium.

According to a known method for evaporating water from maple sap for producing maple syrup, sap is first heated in a primary evaporation pan (or "flue pan", referring to the flues on the pan bottom that distribute heat more evenly). Partially evaporated maple sap produced in the primary pan is then drained to secondary evaporating pans for refining, including further evaporating of water.

Scale formation and deposit on the base and side walls of the secondary evaporation pans is a recurrent maintenance problem for maple syrup producers. In maple syrup production, the circulating sap tends to remain stationary for some time during the evaporation cycle, thus allowing minerals to precipitate from the sap and adhere to the base and side walls of the pans. Over time, a number of layers of calcium and potassium based scale can aggregate on the base of the evaporation pan.

Canadian patent number 2,386,368 discloses a reversing evaporator that provides easy cleaning of secondary evaporation pans. The system helps in the preparation of maple syrup by keeping the bottoms of the pans cleaner and by reducing the depositing of scales that decrease heat transfer. The direction of flow in the pans is carried alternatively between a first and a second pan in such a way that the diluted sap cleans the bottom of the pan. To achieve this, piping is providing as well as control valves for permitting the reversing.

SUMMARY

The subject-matter described herein provide in one aspect an apparatus for reversing flow of partially evaporated maple syrup in at least one evaporating pan, the apparatus including a transfer line having an inlet for connecting to a heating pan and for receiving the partially evaporated maple syrup therefrom, a first sub-line extending from the transfer line and adapted to connect to a first port of the at least one evaporating pan to define a first fluid path between the transfer line and the first port, the transfer line being positioned at the height at least substantially equal to a height of the first port when the first sub-line is connected to the first port, and a second sub-line extending from the transfer line and adapted to connect to a second port of the at least one evaporating pan to define a second fluid path between the transfer line and the second port.

The subject-matter described herein provide in another aspect an apparatus for reversing flow of partially evaporated maple syrup in at least one evaporating pan, the apparatus including a transfer line having an inlet for connecting to a heating pan and for receiving partially evaporated maple syrup therefrom, a first sub-line extending from the transfer line and adapted to connect to a first port of the at least one evaporating pan to define a first fluid path between the transfer line and the first port, a second sub-line extending from the transfer line and adapted to connect to a second port of the at least one evaporating pan to define a second fluid path between the transfer line and the second port, and a first outlet line extending from at least one of the transfer line and the first sub-line and defining a first outlet path, the first outlet line being positioned at a height no higher than the transfer line when the first sub-line is connected to the first port.

The subject-matter described herein provide in another aspect an apparatus for reversing flow of partially evaporated maple syrup in at least one evaporating pan, the apparatus including a transfer line having an inlet for connecting to a heating pan and for receiving partially evaporated maple syrup therefrom, a first sub-line extending from the transfer line and adapted to connect to a first port of the at least one evaporating pan to define a first fluid path between the transfer line and the first port, a second sub-line extending from the transfer line and adapted to connect to a second port of the at least one evaporating pan to define a second fluid path between the transfer line and the second port, a first outlet line extending from the first sub-line to define a first outlet path branching from the first fluid path, a fluid exiting the first port along the first fluid path reaching the first outlet path prior to reaching the transfer line.

DRAWINGS

For a better understanding of the subject-matter described herein and to show more clearly how it may be carried into effect, reference will now be made, by way of example only, to the accompanying drawings which show at least one exemplary embodiment, and in which.

DESCRIPTION OF VARIOUS EMBODIMENTS

Figure 1:
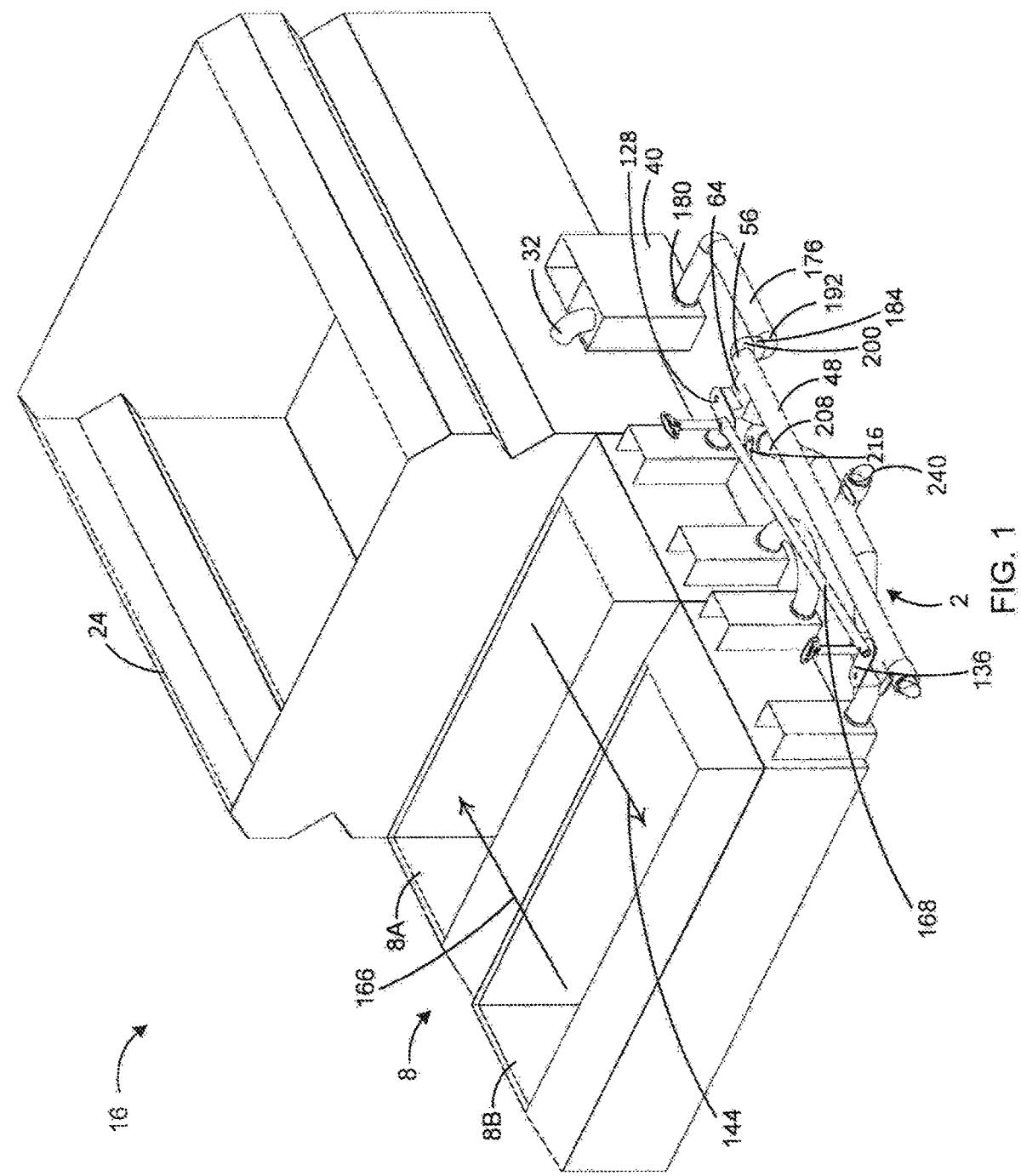
FIG. 1 illustrates a perspective view of an evaporator wherein an exemplary apparatus for reversing of partially evaporated maple syrup has been installed.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

"Partially evaporated maple syrup" or variants thereof herein refers to maple syrup being evaporated in an evaporator wherein an amount of water has already been evaporated compared to sap tapped from maple trees. Fluid drained from a primary evaporating pan (or flue pan or heating pan) of the evaporator is in a partially evaporated state. Maple syrup being flowed through the secondary evaporation pan will have varying amounts of water (depending on how much water has been already been evaporated during its flow). Prior to reaching its finished state, such maple syrup in the secondary evaporation pan remains partially evaporated maple syrup.

"Finished maple syrup" or variants thereof herein refers to maple syrup having had a sufficient amount of water evaporated therefrom such that it no longer needs to be evaporated in the evaporator. Accordingly finished maple syrup is ready to be drained from the evaporator. Finished maple syrup may be ready for consumption or may be further processed in a process subsequent to the evaporator. For example, one can determine that maple syrup has reached its finished maple syrup state by measuring the temperature thereof.

Two elements being "substantially equal in height" or variants thereof herein refers to the two elements being at substantially the same height with respect to an underlying plane such as a floor or ground. For example, where two elements are substantially equal in height, a given object would have the same gravitational potential energy ($U=m \cdot g \cdot h$) when placed at the height of either one of the two elements. An element having been placed at a greater height than another element would have a greater gravitational potential energy that the other element.

Known apparatus and devices for evaporation of water from maple sap in the product of maple syrup, such as those disclosed in Canadian patent number 2,386,368 have a drawback. It has been observed that the pipe connecting the ports of the secondary evaporation pans and used for reversing flow of partially evaporated maple syrup can occasionally have a build-up of denser maple syrup. The maple syrup that is built up in the pipe may be partially evaporated maple syrup or finished maple syrup. As the pipe is also connected to the drain of the primary evaporation pan, the build-up of denser maple syrup constricts the path through which partially evaporating maple syrup draining from the primary evaporation pan flows before reaching the secondary evaporation pan. The constricted path further leads to a higher likelihood that the maple sap or partially evaporated maple syrup may be burnt within the primary evaporation pan.

Figure 2:
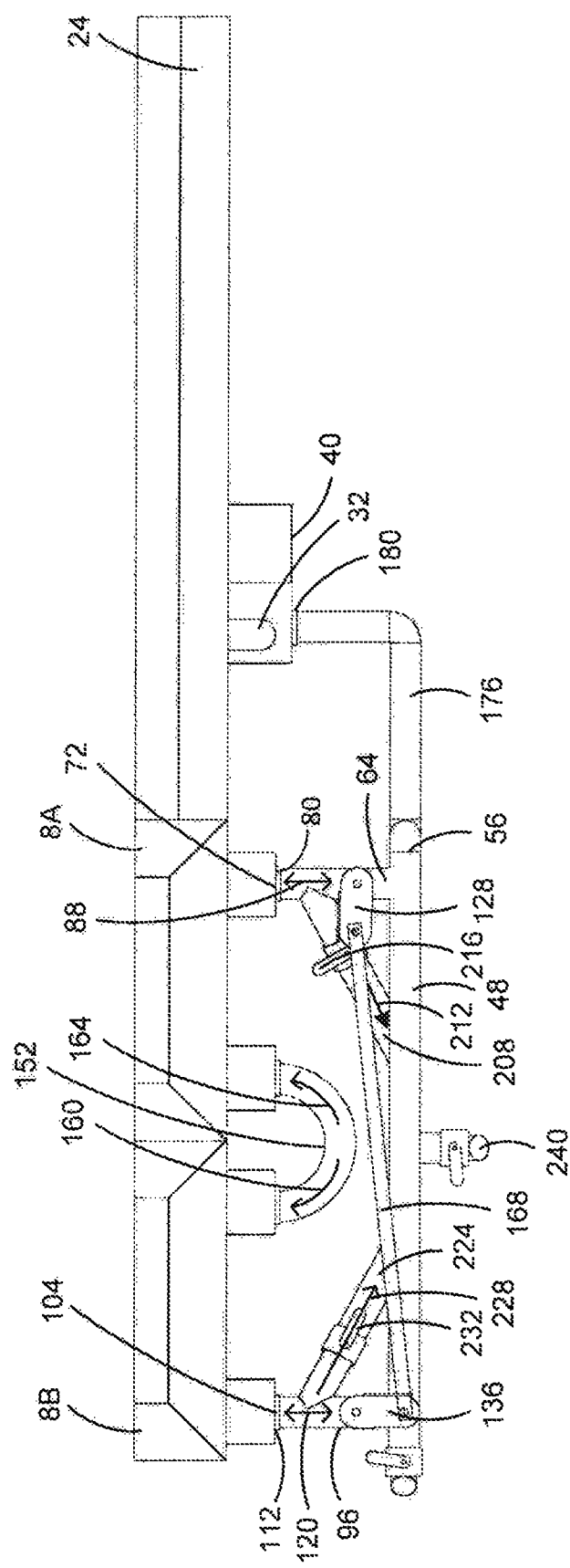
FIG. 2 illustrates a plan view of the exemplary apparatus for reversing of partially evaporated maple syrup having been installed onto pans of an evaporator.
Figure 3:
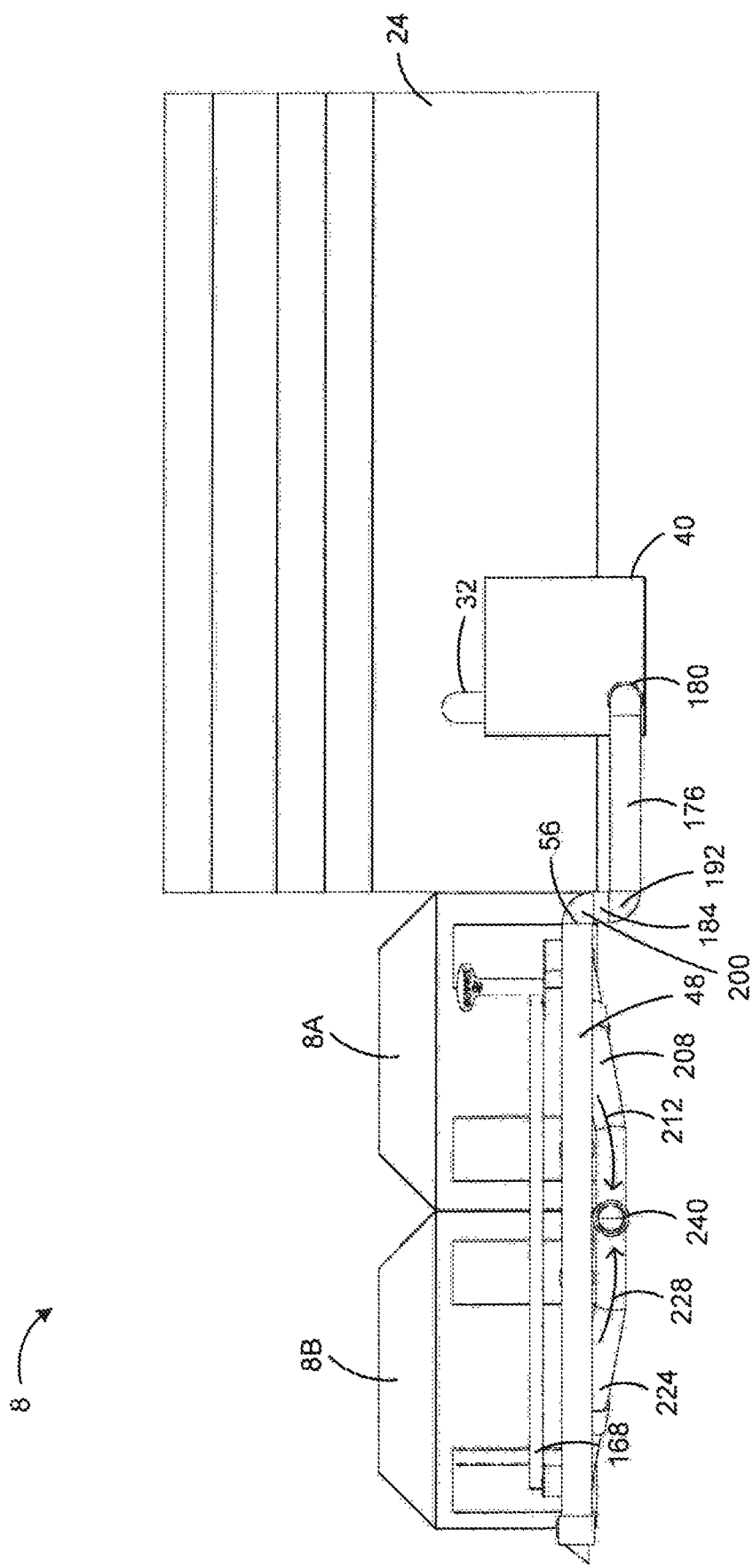
FIG. 3 illustrates a side elevation view of an evaporator wherein the exemplary apparatus for reversing of partially evaporated maple syrup has been installed.

Referring now to FIGS. 1, 2 and 3, therein illustrated is a reversing apparatus 2 for reversing flow of partially evaporated maple syrup in at least one evaporating pan 8 (one or more secondary evaporation pans) of an evaporator 16. As illustrated, the exemplary evaporator 16 includes one heating pan 24 (primary evaporation pan) and a first evaporating pan 8A and a second evaporating pan 8B. For example, the heating pan 24 may also have a system for reversing the flow of the maple syrup and partially evaporated maple syrup contained therein, such as the system disclosed in Canadian patent no. CA2,762,567, which is hereby incorporated by reference.

Partially evaporated maple syrup produced in the heating pan 24 is drained via an outlet 32. The heating pan 24 may include a flood box 40, which aids in equalizing fluid levels within the at least one evaporating pan 8.

The reversing apparatus 2 includes a transfer line 48 having an inlet 56. The inlet 56 is adapted to be connected to the drain 32 of the heating pan 24. The inlet 56 may be connected to the drain 32 or be connected via one or more intermediate elements. For example, where a flood box 40 is provided, the inlet 56 is connected to the drain 32 via the flood box 40. Accordingly, partially evaporated maple syrup drained from the heating pan 24 is received at the inlet 56 of the transfer line 48. For example, the transfer line 48 may be a pipe formed of a material suitable for containing heated partially evaporated maple syrup. Such material includes stainless steel and silicon, but may be any other material known in the art.

A first sub-line 64 extends from the transfer line 48. For example, the first sub-line 64 extends transversely from the transfer line 48. A distal end 72 of the first sub-line 64 is adapted to be connected to a first port 80 of the at least one evaporating pan 8. Depending on the direction of flow, fluid (partially evaporated maple syrup or finished maple syrup) may be entering the pan 8 via the port 80 or exiting the pan 8 via the port 80. When connected to the first port 80, the first sub-line 64 defines a first fluid path 88 between the transfer line 48 and the first port 80.

A second sub-line 96 also extends from the transfer line 48. For example, the second sub-line 96 extends transversely from the transfer line 48. A distal end 104 of the second sub-line 96 is adapted to be connected to a second port 112 of the at least one evaporating pan 8. Depending on the direction of flow, fluid may be entering the pan 8 via the second port 112 or exiting the pan 8 via the second port 112. When connected to the second port 112, the second sub-line 96 defines a second fluid path 120 between the transfer line 48 and the second port 112.

The reversing apparatus 2 further includes a first path blocking means 128 for selectively blocking flow of the partially evaporated maple syrup along the first fluid path 72 through the first sub-line 64. For example, the first path blocking means 128 includes a first valve. The reversing apparatus 2 further includes a second path blocking means 136 for selectively blocking flow of the partially evaporated maple syrup along the second fluid path 120 through the second sub-line 96. For example, the second path blocking means 136 includes a second valve.

In operation, the second path blocking means 136 is actuated to a path blocking position so as to prevent flow of fluid along the second fluid path 120 through the second sub-line 96. At the same time, the first path blocking means 128 is actuated to a path permitting position so as to permit flow of fluid along the first fluid path 88 through the first sub-line 64. Accordingly, partially evaporated maple syrup drained from the heating pan 24 flows along the first fluid path 88 through the first sub-line 64. The partially evaporated maple syrup further enters the at least one pan 8 through the first port 72. The partially evaporated maple syrup further flows through the at least one pan 8 in a direction generally indicated by arrow 144 towards the second port 112. For example, where two or more pans 8 (ex: pans 8A and 8B) are provided, adjacent pans may be fluidly connected via a joining line 152 (ex: U-elbow pipe, as illustrated) and the partially evaporated maple syrup flows in the direction indicated by arrow 160 from the first evaporating pan 8A to the second evaporating pan 8B.

To reverse flow of the partially evaporated maple syrup, first path blocking means 128 is actuated to a path blocking position so as to prevent flow of fluid along the first fluid path 88 through the first sub-line 64. At the same time, the second path blocking means 136 is actuated to a path permitting position so as to permit flow of fluid along the second fluid path 120 through the second sub-line 96.

Accordingly, partially evaporated maple syrup drained from the heating pan 24 flows along the second fluid path 112 through the second sub-line 96. The partially evaporated maple syrup further enters the at least one pan 8 through the second port 104. The partially evaporated maple syrup further flows through the at least one pan 8 in a direction generally indicated by arrow 166 towards the first port 80. For example, where two or more pans 8 (ex: pans 8A and 8B) are provided, adjacent pans may be fluidly connected via joining line 152 and the partially evaporated maple syrup flows in the directed indicated by arrow 164 from the second evaporating pan 8B to the first evaporating pan 8A.

According to one exemplary embodiment, the reversing apparatus 2 further includes a mechanical valve control 168 for simultaneously actuating the first valve 128 and the second valve 136. The mechanical valve control 168 joins the first valve 128 and the second valve 136 in such a way that only one of the first valve 128 and the second valve 136 may be in a path blocking position at any one time. For example, the mechanical valve control 168 may be an elongated member being pivotally coupled to both the first valve 128 and second valve 136. For example, the mechanical valve control 168 may be useful to prevent human error caused by improper actuating of the first path blocking means 128 and the second path blocking means 136.

According to various exemplary embodiments, when the first sub-line 64 is connected to the first port 80, the transfer line 48 is positioned at a height that is at least substantially equal to the height of the first port 80 of the at least one evaporating pan 8. That is, the transfer line 48 is at a height that is substantially level with the height of the first port 80 or the transfer line 48 is at a height that is higher than the height of the first port 80. Accordingly, fluid (partially evaporated maple syrup or finished maple syrup) exiting the at least one pan 8 through the first port 80 is not urged towards the transfer line 48 due to the force of gravity.

Additionally or alternatively, when the second sub-line 96 is connected to the second port 112, the transfer line 48 is positioned at a height that is at least substantially equal to the height of the second port 104 of the at least one evaporating pan 8. That is, the transfer line 48 is at a height that is substantially level with the height of the second port 112 of the transfer line 48 is at a height that is higher than the height of the second port 112. Accordingly, fluid (ex: partially evaporated maple syrup or finished maple syrup) exiting the at least one pan 8 through the second port 112 is not urged towards the transfer line 48 due to the force of gravity.

According to one exemplary embodiment, where the transfer line 48 is positioned at a height at least substantially equal to the height of the first port 80 and/or the second port 112, a connecting portion 176 may be provided to join the transfer line 48 to a drain 32 of the heating pan 24 and to reconcile a difference in height therebetween. For example, as illustrated in FIGS. 1 and 3, when first sub-line 64 and second sub-line 96 are connected to the first port 80 and second port 112 respectively, the transfer line 48 is positioned at a height that is substantially higher than an outlet 180 of the flood box 40 of the heating pan 24. Accordingly, the connecting portion 176 includes a vertical portion 184 that joins the connecting portion 176 to the higher transfer line 48. For example, a first elbow 192 and a second elbow 200 may be provided to connect the connecting portion 176, the vertical portion 184 and the transfer line 48.

The reversing apparatus 2 further includes a first outlet line 208 for draining the at least one evaporating pan 8 when the maple syrup contained therein has reached a finished state. As illustrated, the first outlet line 208 extends from the first sub-line 64, but it may also extend from the transfer line 48. The first outlet line 208 defines a first outlet path 212 that leads from the transfer line 48 or first sub-line 64 to an outlet from which the finished maple syrup can be drained. The first outlet line 208 further includes a third path blocking means 216 for selectively blocking flow of liquid along the first outlet path 212 defined by the first outlet line 208. For example, the third path blocking means 216 includes a third valve.

According to various exemplary embodiments, the first outlet line 208 is positioned at a height no higher than the transfer line 48 when the first sub-line 64 is connected to the first port 80 of the at least one evaporating pan 8. That is, the first outlet line 208 is at a height that is substantially level with the transfer line 48 or at a height lower than the transfer line 48. For example, any point along the first outlet path 212 is equal in height to or lower than the transfer line 48. For example, as illustrated in FIG. 3, the first outlet line 208 is inclined downwardly from the first sub-line 64 towards the outlet of the first outlet line 208. Accordingly, fluid exiting the at least one evaporating pan via the first port 80 tends to flow into the first outlet path prior to flowing to the transfer line 48. Of course, the flow to the first outlet path may be blocked by appropriately controlling the third path blocking means 216.

The reversing apparatus 2 further includes a second outlet line 224 for draining the at least one evaporating pan 8 when the maple syrup contained therein has reached a finished state. As illustrated, the second outlet line 224 extends from the second sub-line 96, but it may also extend from the transfer line 48. The second outlet line 224 defines a second outlet path 228 that leads from the transfer line 48 or second sub-line 96 to an outlet from which the finished maple syrup can be drained. The second outlet line 224 further includes a fourth path blocking means 232 for selectively blocking flow of liquid along the second outlet path 228 defined by the second outlet line 224. For example, the fourth path blocking means 232 includes a fourth valve.

According to various exemplary embodiments, the second outlet line 224 is positioned at a height no higher than the transfer line 48 when the second sub-line 96 is connected to the second port 112 of the at least one evaporating pan 8. That is, the second outlet line 224 is at a height that is substantially level with the transfer line 48 or at a height lower than the transfer line 48. For example, any point along the second outlet path 228 is equal in height to or lower than the transfer line 48. For example, as illustrated in FIG. 3, the first outlet line 224 is inclined downwardly from the second sub-line 96 towards the outlet of the second outlet line 224. Of course, the flow to the second outlet path may be blocked by appropriately controlling the fourth path blocking means 224.

According to various exemplary embodiments, the first outlet line 208 extends from the first sub-line 64 and the first outlet path 212 defined by the first outlet line 208 branches from the first fluid path 88 defined by the first sub-line 64. Accordingly, fluid exiting the first port 80 along the first fluid path 88 reaches the first outlet path 212 prior to reaching the transfer line 48. Furthermore, in a direction of first port 80 to transfer line 48, the first outlet line 208 branches at a position along the first sub-line 64 before the position of the first blocking means 128. When finished maple syrup is being drained from the at least one pan through the first port 80, the maple syrup will tend to flow to the first outlet path 212 towards the drain before flowing towards the transfer line 48.

According to various exemplary embodiments, the second outlet line 224 extends from the second sub-line 96 and the second outlet path 228 defined by the second outlet line 224 branches from the second fluid path 120 defined by the second sub-line 96. Accordingly, fluid exiting the second port 104 along the second fluid path 120 reaches the second outlet path 228 prior to reaching the transfer line 48. Furthermore, in a direction of second port 112 to transfer line 48, the second outlet line 224 branches at a position along the second sub-line 96 before the position of the second blocking means 136. When finished maple syrup is being drained from the at least one pan through the second port 112, the maple syrup will tend to flow to the second outlet path 228 towards the drain before flowing towards the transfer line 48.

According to one exemplary method of operation, both the third path blocking means 216 and the fourth path blocking means 232 are actuated to path blocking positions when the maple syrup in the at least one evaporating pan 8 has not yet reached a finished state. After reaching a finished state, one of the third path blocking means 216 and fourth path blocking means 232 can be actuated to a fluid permitting position to allow draining of the finished maple syrup. Which of the third path blocking means 216 and fourth path blocking means 232 is actuated depends on the direction of the flow of maple syrup through the at least one evaporating pan 8. For example, where the first path blocking means 128 is actuated to its path blocking position, the third path blocking means 216 is actuated to its path permitting position so that finished maple syrup exiting the at least one evaporating pan 8 through the first port 80 is drained through the first outlet line 208. For example, where the second path blocking means 128 is actuated to its path blocking position, the fourth path blocking means 224 is actuated to its path permitting position so that finished maple syrup exiting the at least one evaporating pan 8 through the second port 112 is drained through the second outlet line 224.

According to one exemplary embodiment, the first outlet line 208 and the second outlet line 224 fluidly communicate with one another and share a common drain 240. Additionally, the common drain 240 can be automatically controlled via a control signal from a controller. For example, the common drain 240 may include an automated valve for selectively opening or closing the drain. For example, the controller may be configured to automatically open the common drain 240 when it receives an indication that the maple syrup in the at least one evaporating pan 8 has reached a finished state. For example, the indication may be a measurement of the temperature of the maple syrup in the at least one evaporate pan 8, such as obtained by an automated measurement device.

The controller described herein may be implemented in hardware or software, or a combination of both. It may be implemented on a programmable processing device, such as a microprocessor or microcontroller, Central Processing Unit (CPU): Digital Signal Processor (DSP), Field Programmable Gate Array (FPGA), general purpose processor, and the like. In some embodiments, the programmable processing device can be coupled to program memory, which stores instructions used to program the programmable processing device to execute the controller. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

According to one exemplary method of operation where the first outlet line 208 and the second outlet line 224 share a common drain 240, the third and fourth path blocking means 216, 232 are operated at the same time as the operating of the first and second path blocking means 128, 136. When the second path blocking means 136 is actuated to a path blocking position and the first path blocking means 128 is actuated to a path permitting position, the third path blocking means 216 is actuated to its path blocking position and the fourth path blocking means 232 is actuated to its path permitting position. Accordingly, maple syrup received from the heating pan 8 flows along a path of first sub-line 64 to the first port 80 to the at least one evaporating pan 8 to the second port 112 to the second sub-line 96 to the second outlet sub-line 224 to reach the common drain 240. When the maple syrup reaches its finished state, the common drain 240 can be opened.

When flow of the partially evaporated maple syrup is reversed and when the second path blocking means 136 is actuated to a path permitting position and the first path blocking means 128 is actuated to a path blocking position, the third path blocking means 216 is actuated to its path permitting position and the fourth path blocking means 232 is actuated to its path blocking position. Accordingly, maple syrup received from the heating pan 8 flows along a path of transfer line 48 to the second sub-line 96 to the second port 112 to the at least one evaporating pan 8 to the first port 80 to the first sub-line 64 to the first outlet sub-line 208 to reach the common drain 240. When the maple syrup reaches its fully evaporating state, the common drain 240 can be opened.

Accordingly, when actuating the first and second path blocking means 128, 136 to reverse flow of maple syrup through the at least one evaporating pan, the third and fourth path blocking means 208, 224 are also actuated so that the maple syrup arrives at the common drain 240 over the appropriate outlet path (via first outlet line 208 or second outlet line 224).

In some exemplary embodiments, each of the first, second, third and fourth path blocking means 128, 136, 216 and 232 include manually actuated valves.

According to one exemplary embodiment, the mechanical valve control 168 can simultaneously actuating the first valve 128, second valve 136, third valve 216 and fourth valve 232. The mechanical valve control 168 joins the valves 128, 136, 216 and 232 in such a way that the valves may be actuated between the two combinations described herein. In a first combination, the first valve 128 is in a path blocking position, the second valve 136 is in a path permitting position, the third valve 216 is in a path permitting position and the fourth valve 232 is in a path blocking position. In a second combination, the first valve 128 is in a path permitting position, the second valve 136 is in a path blocking position, the third valve 216 is in a path blocking position and the fourth valve 232 is in a path permitting position. For example, the mechanical valve control 168 may be useful to prevent human error caused by improper actuating of the first path blocking means 128, the second path blocking means 136, third path blocking means 216 and fourth path blocking means 232.

Alternatively, one or more of the path blocking means 128, 136, 216 and 232 include automatically controlled valves, such as controlled by the controlled. These automatically controlled valves may controlled according to the operating scheme described herein.

Various examples of the reversing apparatus 2 described herein may be adapted to be used with secondary evaporation pans of different types and models. For example, the opening at the distal end 72 of the first sub-line 64 and the opening at the distal end 104 of the second sub-line 96 may be appropriately chosen based on the size of the ports of a given secondary evaporation pan to which the first and second sub-lines are to be attached. For example, the length of the transfer line 48 may be appropriately chosen based on the size of a given secondary evaporation pan and the distance between the ports of the evaporation pan.

The buildup of denser maple syrup in the pipe connecting the ports of the secondary evaporating pan is at least partially mitigated in various exemplary embodiments described herein where the transfer line 48 is positioned at a height at least substantially equal to a height of the first port 80 when the first sub-line 64 is connected to the first port 80 and/or the transfer line 48 is positioned at a height at least substantially equal to the second height of the second port 112 when the second sub-line 64 is connected to the second port 112. When compared to configurations where the pipe connecting the ports of the secondary evaporating pan is at a height lower than the ports, the exemplary embodiments described herein allow for the partially evaporated maple syrup received from the heating pan 24 to more easily push out any denser maple syrup built up in the transfer line 48, such as through the second sub-line 96 into the at least one evaporating pan 8.

The buildup of denser maple syrup in the pipe connecting the ports of the secondary evaporation pan is at least partially mitigated in various exemplary embodiments described herein where the first outlet line 208 and/or the second outlet line 224 is positioned at a height no higher than the transfer line 48 when the first sub-line 64 is connected to the first port 80 and/or the second sub-line is connected to the second port 112. When compared to configurations where the pipe connecting ports of the secondary evaporating pan is at a height lower than the outlet lines, exemplary embodiments described herein leads to fluid exiting the at least one evaporating pan 8 via the first port 80 or the second port 112 to tend to flow into the first outlet line 208 or second outlet line 224 before flowing to the transfer line 48. Furthermore, exemplary embodiments described herein may also allow for the partially evaporated maple syrup received from the heating pan 24 to more easily push out any denser maple syrup built up in the transfer line 48, such as towards the common drain 240 via the first outlet line 208 and/or the second outlet line 224.

The buildup of denser maple syrup in the pipe connecting the ports of the secondary evaporation pan(s) is at least partially mitigated in the various exemplary embodiments described herein where the first outlet line 208 and/or the second outlet line 224 defines an outlet path (first outlet path 212 and/or second outlet path 228) branching from a sub-line (first sub-line 64 and/or second sub-line 96) and fluid exiting one of the ports (first port 80 and/or second port 112) reaches the outlet path prior to reaching the transfer line 48. When compared to configurations where fluid exiting a port of the second evaporation pan reaches a line joining the connecting pipe prior to reaching an outlet line to a drain, exemplary embodiments described herein leads to fluid exiting the at least one evaporating pan 8 via the first port 80 or the second port 112 to tend to flow into the first outlet line 208 or second outlet line 224 before flowing to the transfer line 48.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. An apparatus for reversing flow of partially evaporated maple syrup in at least one evaporating pan, the apparatus comprising:
    a transfer line having an inlet for connecting to a heating pan and for receiving the partially evaporated maple syrup therefrom;
    a first sub-line extending from the transfer line and adapted to connect to a first port of the at least one evaporating pan to define a first fluid path between the transfer line and the first port, the entire transfer line being positioned at a height at least substantially equal to the height of the first port when the first sub-line is connected to the first port;
    a first outlet line for draining the at least one evaporating pan, located on the first sub-line and between the transfer line and the first port of the at least one evaporating pan, the first outlet line extending from the first sub-line and defining a first outlet path that ends with a common outlet from which maple syrup can be drained, wherein:
        the first outlet line has a first valve that selectively blocks the flow of liquid along the first outlet path, and
        the first outlet line inclines downwardly from the first sub-line toward the common outlet, so that fluid exiting the at least one evaporating pan via the first port flows into the first outlet path prior to flowing to the transfer line;
    a second sub-line extending from the transfer line and adapted to connect to a second port of the at least one evaporating pan to define a second fluid path between the transfer line and the second port;
    a second outlet line for draining the at least one evaporating pan, located on the second sub-line and between the transfer line and the second port of the at least one evaporating pan, the second outlet line extending from the second sub-line and defining a second outlet path that ends with the common outlet from which maple syrup can be drained, such that both the first outlet line and the second outlet line lead to the common outlet, wherein:
        the second outlet line has a second valve that selectively blocks the flow of liquid along the second outlet path, and
        the second outlet line inclines downwardly from the first sub-line toward the common outlet, so that fluid exiting the at least one evaporating pan via the second port flows into the second outlet path prior to flowing to the transfer line;
    a third valve that selectively blocks the flow of the partially evaporated maple syrup through the first fluid path;
    a fourth valve that selectively blocks the flow of the partially evaporated maple syrup through the second fluid path;

a mechanical valve control that simultaneously actuates the first, second, third and fourth valves such that the aforementioned valves are actuated between first and second combinations, wherein the mechanical valve control joins the first, second, third and fourth valves, wherein:
  in the first combination, the third valve and the second valve are in a path blocking position, and the fourth valve and the first valve are in a path permitting position, and
  in the second combination, the third valve and the second valve are in a path permitting position, and the fourth valve and the first valve are in a path blocking position; and
wherein:
  in the first combination, the partially evaporated maple syrup received from the heating pan flows along a path of the transfer line to the second sub-line, then to the second port, and then to the at least one evaporating pan, and then to the first port, and then to the first sub-line, and then to the first outlet sub-line to reach the common outlet; and
  in the second combination, the flow of the partially evaporated maple syrup is reversed compared to the flow of the first combination such that the partially evaporated maple syrup received from the heating pan flows along the path of the first sub-line to the first port, then to the at least one evaporating pan, and then to the second port, and then to the second sub-line, and then to the second outlet sub-line to reach the common outlet.

2. The apparatus of claim 1, wherein the transfer line is positioned at a height at least substantially equal to the height of the second port when the second sub-line is connected to the second port.

3. The apparatus of claim 1, wherein:
  the first outlet line is positioned at a height no higher than the transfer line when the first sub-line is connected to the first port; and
  the second outlet line is positioned at a height no higher than the transfer line when the second sub-line is connected to the second port.

4. An apparatus for reversing flow of partially evaporated maple syrup in at least one evaporating pan, the apparatus comprising:
  a transfer line having an inlet for connecting to a heating pan and for receiving partially evaporated maple syrup therefrom;
  a first sub-line extending from the transfer line and adapted to connect to a first port of the at least one evaporating pan to define a first fluid path between the transfer line and the first port;
  a second sub-line extending from the transfer line and adapted to connect to a second port of the at least one evaporating pan to define a second fluid path between the transfer line and the second port; and
  a first outlet line for draining the at least one evaporating pan, located on the first sub-line and between the transfer line and the first port of the at least one evaporating pan, the first outlet line extending from the first sub-line and defining a first outlet path that ends with a common outlet from which maple syrup can be drained, wherein:
    the first outlet line has a first valve that selectively blocks the flow of liquid along the first outlet path, and
    the first outlet line inclines downwardly from the first sub-line toward the common outlet, so that fluid exiting the at least one evaporating pan via the first port flows into the first outlet path prior to flowing to the transfer line; and
  a second outlet line for draining the at least one evaporating pan, located on the second sub-line and between the transfer line and the second port of the at least one evaporating pan, the second outlet line extending from the second sub-line and defining a second outlet path that ends with the common outlet from which maple syrup can be drained, such that both the first outlet line and the second outlet line lead to the common outlet, wherein:
    the second outlet line has a second valve that selectively blocks the flow of liquid along the second outlet path, and
    the second outlet line inclines downwardly from the first sub-line toward the common outlet, so that fluid exiting the at least one evaporating pan via the second port flows into the second outlet path prior to flowing to the transfer line;
  a third valve that selectively blocks the flow of the partially evaporated maple syrup through the first fluid path;
  a fourth valve that selectively blocks the flow of the partially evaporated maple syrup through the second fluid path;
  a mechanical valve control that simultaneously actuates the first, second, third and fourth valves such that the aforementioned valves are actuated between first and second combinations, wherein the mechanical valve control joins the first, second, third and fourth valves wherein:
    in the first combination, the third valve and the second valve are in a path blocking position, and the fourth valve and the first valve are in a path permitting position, and
    in the second combination, the third valve and the second valve are in a path permitting position, and the fourth valve and the first valve are in a path blocking position;
  and
wherein:
  in the first combination, the partially evaporated maple syrup received from the heating pan flows along a path of the transfer line to the second sub-line, then to the second port, and then to the at least one evaporating pan, and then to the first port, and then to the first sub-line, and then to the first outlet sub-line to reach the common outlet; and
  in the second combination, the flow of the partially evaporated maple syrup is reversed compared to the flow of the first combination such that the partially evaporated maple syrup received from the heating pan flows along the path of the first sub-line to the first port, then to the at least one evaporating pan, and then to the second port, and then to the second sub-line, and then to the second outlet sub-line to reach the common outlet.

5. The apparatus of claim 4, wherein the transfer line is positioned at a height at least substantially equal to the height of the first port when the first sub-line is connected to the first port and at a height at least substantially equal to the height of the second port when the second sub-line is connected to the second port.

\* \* \* \* \*